United States Patent
Yamanaka et al.

(10) Patent No.: US 9,948,218 B2
(45) Date of Patent: Apr. 17, 2018

(54) LINEAR MOTOR APPARATUS AND CONTROL METHOD

(71) Applicant: THK CO., LTD., Tokyo (JP)

(72) Inventors: Shuhei Yamanaka, Tokyo (JP); Yuki Nomura, Tokyo (JP); Tsuyoshi Inda, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/324,799

(22) PCT Filed: Jul. 24, 2015

(86) PCT No.: PCT/JP2015/071131
§ 371 (c)(1),
(2) Date: Jan. 9, 2017

(87) PCT Pub. No.: WO2016/013664
PCT Pub. Date: Jan. 28, 2016

(65) Prior Publication Data
US 2017/0207734 A1    Jul. 20, 2017

(30) Foreign Application Priority Data

Jul. 25, 2014 (JP) ................. 2014-151819
Jun. 24, 2015 (JP) ................. 2015-126447

(51) Int. Cl.
*H02P 5/68* (2006.01)
*H02K 41/035* (2006.01)
*H02P 7/02* (2016.01)

(52) U.S. Cl.
CPC ............ *H02P 5/68* (2013.01); *H02K 41/035* (2013.01); *H02P 7/02* (2016.02)

(58) Field of Classification Search
CPC ........................................ H02P 5/68
(Continued)

(56) References Cited

U.S. PATENT DOCUMENTS 6,590,355 B1 *  7/2003  Kikuchi ............ G03F 7/70716
                                              310/12.06
2007/0194632 A1  8/2007  Motozumi
2008/0079319 A1  4/2008  Okada et al.

FOREIGN PATENT DOCUMENTS

CN    103105743 A    5/2013
DE    3938088 A1     5/1991
(Continued)

OTHER PUBLICATIONS

Office Action dated Aug. 16, 2017, issued in counterpart Chinese Application No. 201580039491.3, with English translation (16 pagse).

(Continued)

*Primary Examiner* — David S Luo
(74) *Attorney, Agent, or Firm* — Westerman, Hattori, Daniels & Adrian, LLP

(57) ABSTRACT

This linear motor apparatus includes: a first linear motor and a second linear motor, movable bodies of which move in the same direction in a linked manner; a first control portion that causes the first linear motor to produce thrust to apply a load to a pressurizing target via the movable bodies; and a second control portion that causes the second linear motor to produce thrust and controls the thrust, wherein, if the first control portion is causing a load to be applied to the pressurizing target, then the second control portion causes the second linear motor to produce thrust that cancels an external force produced to the movable bodies.

9 Claims, 13 Drawing Sheets

(58) Field of Classification Search
USPC .................................................. 318/135, 34
See application file for complete search history.

(56) References Cited

FOREIGN PATENT DOCUMENTS

| | | |
|---|---|---|
| DE | 102007007364 A1 | 8/2007 |
| EP | 2397315 A2 | 12/2011 |
| JP | 8-309620 A | 11/1996 |
| JP | 2000-312992 A | 11/2000 |
| JP | 2001-225194 A | 8/2001 |
| JP | 2008-86145 A | 4/2008 |
| JP | 2008-93665 A | 4/2008 |
| JP | 2013-510003 A | 3/2013 |

OTHER PUBLICATIONS

International Search Report dated Oct. 13, 2015, issued in counterpart application No. PCT/JP2015/071131,w/ English translation . (6 pages).

Decision to Grant a Patent dated Aug. 9, 2016, Issued in counterpart Japanese Patent Application No. 2015-126447, w/English translation (6 pages).

Office Action dated Feb. 6, 2018, issued in counterpart German application No. 112015003427.7, with English translation (9 pages).

\* cited by examiner

FIG. 12

| CURRENT RESOLUTION OF MASTER CONTROL PORTION Rm | CURRENT RESOLUTION OF ASSIST CONTROL PORTION Ra | RETENTION CURRENT VALUE H | PRESSING CURRENT COMMAND U | PRESSING CURRENT VALUE OF MASTER CONTROL PORTION Am | ASSIST CURRENT VALUE OF ASSIST CONTROL PORTION Aa | TOTAL OF PRESSING CURRENT VALUES Atotal | ERROR |
|---|---|---|---|---|---|---|---|
| 2 | 0.4 | −4 | 1 | 2 | −5.2 | 0.8 | 0.2 |
| | | | 11 | 12 | −5.2 | 10.8 | 0.2 |
| | | | 13 | 14 | −5.2 | 12.8 | 0.2 |
| | | | 15.1 | 16 | −4.8 | 15.2 | −0.1 |
| | | | 18.7 | 20 | −5.2 | 18.8 | −0.1 |

UNIT OF EACH VALUE IS [A]

LINEAR MOTOR APPARATUS AND CONTROL METHOD

TECHNICAL FIELD

The present invention relates to a linear motor apparatus and a control method.

The present application claims priority based on Japanese Patent Application No. 2014-151819 filed on Jul. 25, 2014 and Japanese Patent Application No. 2015-126447 filed on Jun. 24, 2015, the contents of which are incorporated herein by reference.

BACKGROUND ART

In mounting apparatuses that mount a workpiece, such as an electric part, onto a substrate, machining apparatuses that machine a workpiece as a machining target, and other apparatuses, a linear motor is used as a means that drives a bead portion, which is brought into contact with or close to a workpiece, in the vertical direction. In such mounting apparatuses and machining apparatuses, a load to be applied to a workpiece when the head portion is pressed against the workpiece is controlled by increasing and decreasing the thrust that is produced by the linear motor. On the head portion operating in the vertical direction, there acts a downward external force in the vertical direction by gravitation. Therefore, in controlling the thrust of the linear motor, control in consideration of the weight of the head portion is required. To make the control in consideration of the weight of the head portion, there are cases where a balancer for equilibrium in accordance with the weight of the head portion is used (Patent Document 1).

RELATED ART DOCUMENT

Patent Document

Patent Document 1: Japanese Unexamined Patent Application, First Publication No. H08-309620

SUMMARY

Problems to be Solved by the Invention

However, when a balancer for equilibrium is used as is the case with the technique described in Patent Document 1, a loss is produced in the thrust of the linear motor that drives the head portion in the vertical direction. This results in a problem in that the speed when the head portion is moved is limited.

Aspects of the present invention have been achieved in order to solve the aforementioned problem, and have an object to provide a linear motor apparatus and a control method that are capable of making thrust control easy while suppressing a thrust loss of a driving linear motor.

Means for Solving the Problem

A linear motor apparatus according to a first aspect of the present invention is a linear motor apparatus that includes: a first linear motor and a second linear motor, movable bodies of which move in a same direction in a linked manner, a first control portion that causes the first linear motor to produce thrust to apply a load to a pressurizing target via the movable bodies; and a second control portion that causes the second linear motor to produce thrust and controls the thrust, wherein, if the first control portion is causing a load to be applied to the pressurizing target, then the second control portion causes the second linear motor to produce thrust that cancels an external force produced to the movable bodies.

In addition, a control method according to a second aspect of the present invention is a control method for a linear motor apparatus that includes: a first linear motor and a second linear motor, movable bodies of which move in a same direction in a linked manner, a first control portion that causes the first linear motor to produce thrust to apply a load to a pressurizing target via the movable bodies; and a second control portion that causes the second linear motor to produce thrust and controls the thrust, the control method having a first step in which, if the first control portion is causing a load to be applied to the pressurizing target, then the second control portion causes the second linear motor to produce thrust that cancels an external force produced to the movable bodies.

Advantage of the Invention

According to the aspects of the present invention, when the first linear motor is caused to produce thrust for applying a load to the pressurizing target, the second linear motor is caused to produce thrust that cancels an external force acting on the movable part. As a result, in the control on the first linear motor, it is not necessary to take into consideration the external force acting on the movable part. This makes control on the first linear motor easy. Furthermore, in the case of not applying a load to the pressurizing target, the second linear motor is caused to produce thrust in the same direction as that of the thrust produced by the first linear motor. As a result, it is possible to suppress a thrust loss of the first linear motor in the case of not applying a load to the pressurizing target.

BRIEF DESCRIPTION OF THE DRAWINGS

FIG. 12 is a diagram showing an example of thrust control by utilization of a difference in current resolution between the master control portion and the assist control portion.

DESCRIPTION OF THE EMBODIMENTS

First Embodiment

Figure 1:
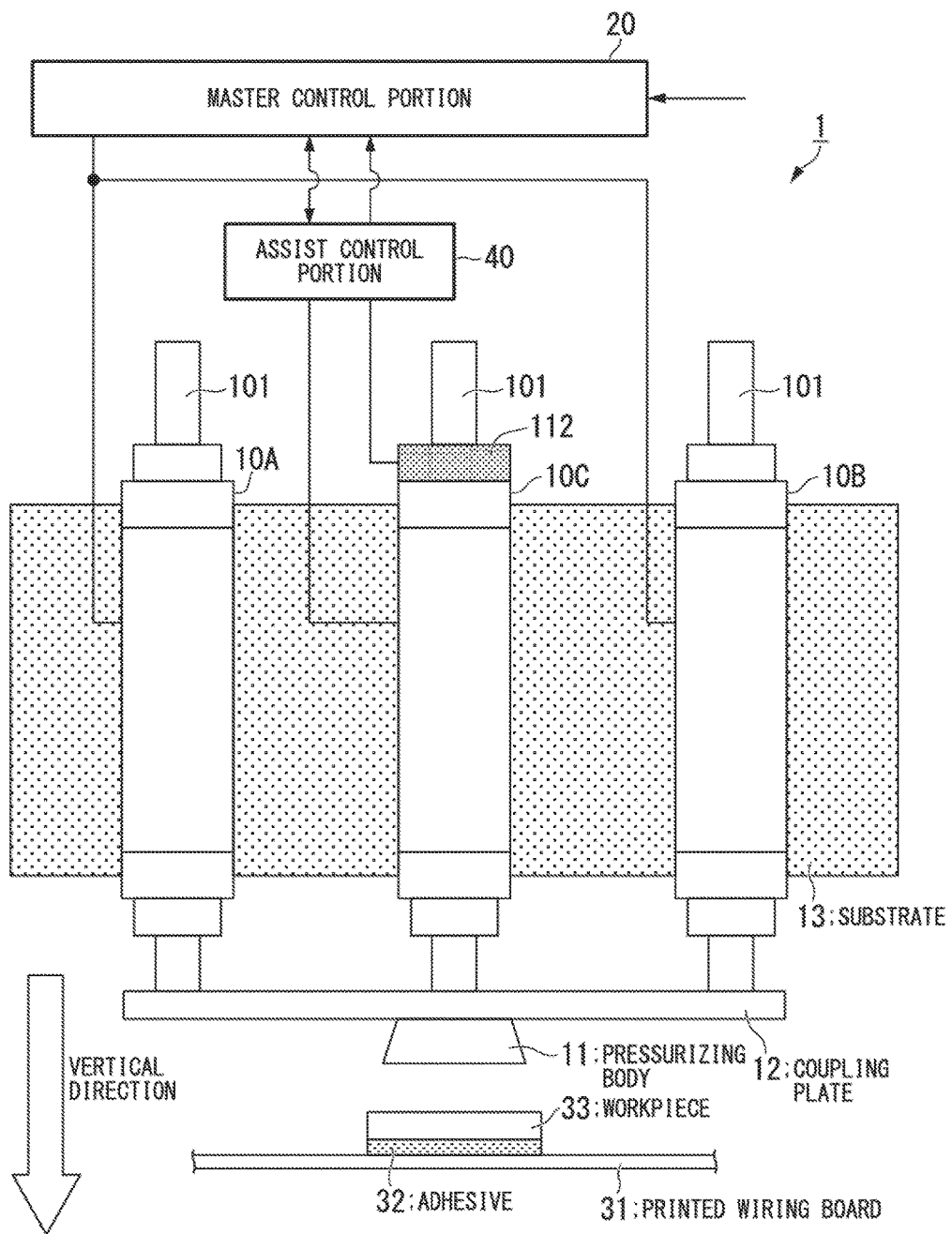
FIG. 1 is a block diagram showing a structure of a machining apparatus to which a linear motor apparatus according to a present embodiment is applied.

Hereunder is a description of a linear motor apparatus and a control method according to embodiments of the present invention with reference to the drawings. FIG. 1 is a block diagram showing a structure of a machining apparatus 1 to which a linear motor apparatus according to a first embodiment is applied. The machining apparatus 1 includes: a plurality of linear motors 10 including linear motors 10A and 10B as first linear motors and a linear motor 10C as a second linear motor; a coupling plate 12 that couples rods 101, which are movable bodies of the linear motors 10; a pressurizing body 11 that is attached to the coupling plate 12; a substrate 13 to which the linear motors 10 are attached; a master control portion 20 as a first control portion that controls drives of the linear motors 10A and 10B; and an assist control portion 40 as a second control portion that controls a drive of the linear motor 10C. Being fixed to the coupling plate, the rods 101 of the linear motors 10 operate in a linked manner. As a result, the rods 101 of the linear motors 10 simultaneously move the same distance in the same direction.

The machining apparatus 1 drives the linear motors 10 to move the pressurizing body 11, which is attached to the coupling plate 12, in the vertical direction, to thereby press a workpiece 33 (for example, electronic part) as a pressurizing target against a printed wiring board 31. As a result, the machining apparatus 1 attaches the workpiece 33 to a predetermined location of the printed wiring board 31 via an adhesive 32.

Figure 2:
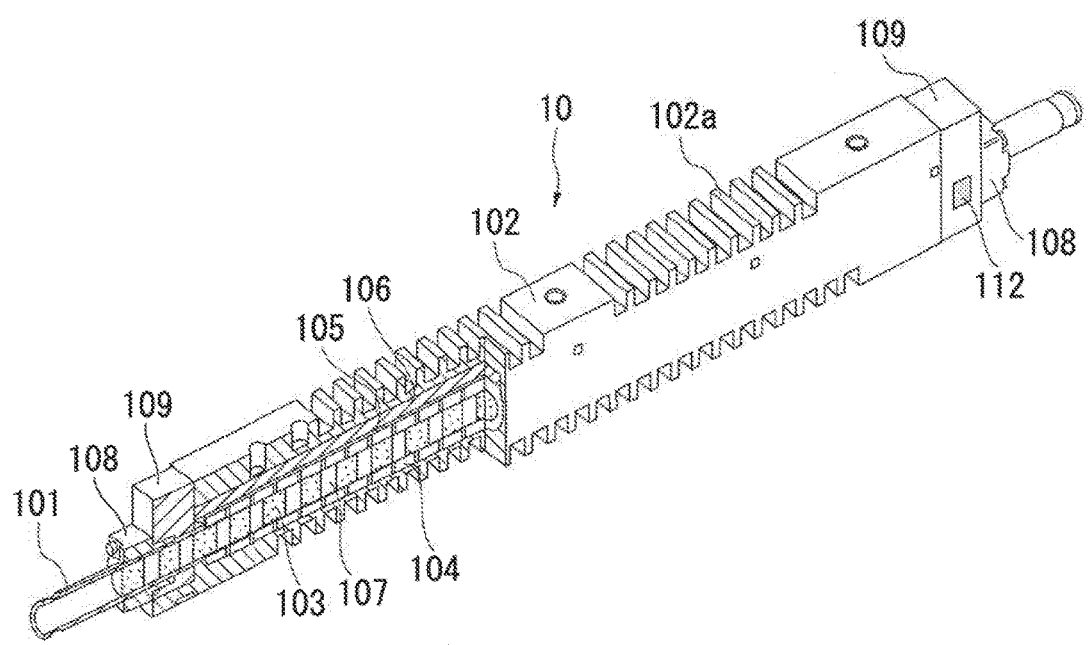
FIG. 2 is a perspective view (partially cross-sectional view) of the linear motor according to the present embodiment.

FIG. 2 is a perspective view (partially cross-sectional view) of the linear motor of the first embodiment. In each linear motor 10, the rod 101 moves in an axis line direction with respect to a coil container case 102.

In the coil container case 102, there are stacked (arrayed) a plurality of coils 104 that are held by a coil holder 105. To each of both end faces of the coil container case 102, there is attached an end case 109. To the end case 109, there is attached a bushing 108 that is a bearing for guiding a linear movement of the rod 101.

The rod 101 is made of a non-magnetic material such as, for example, stainless steel, and has a hollow space like a pipe. In the hollow space of the rod 101, there are stacked a plurality of cylindrical magnets 103 (segment magnets) so that the same poles face each other. Namely, the magnets 103 are stacked so that N poles face each other between each magnet 103 and a first of its adjacent magnets 103 and so that S poles face each other between each magnet 103 and a second of its adjacent magnets 103. Between the magnets 103, there is interposed a pole shoe 107 (pole block) made of a magnetic body such as, for example, iron. The rod 101 penetrates through the interiors of the stacked coils 104, and is also supported by the coil container case 102 so as to be movable in the axis line direction.

Figure 3:
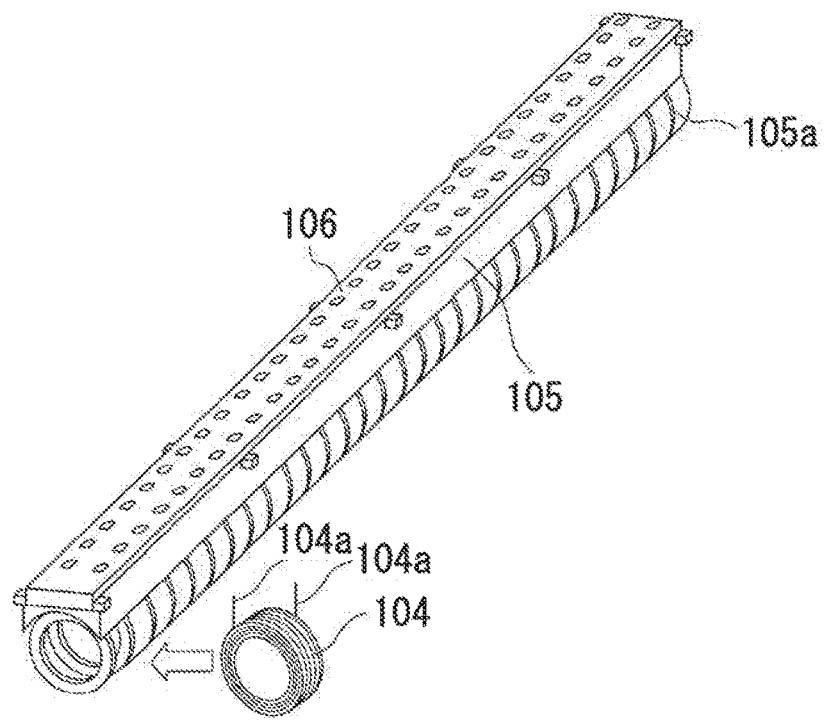
FIG. 3 is a perspective view showing coil units that are held by a coil holder according to the present embodiment.

FIG. 3 is a perspective view showing coil units held by the coil holder 105 of the first embodiment. As shown in the figure, the coil 104 is made of a copper wire wound in a spiral shape, and is held by the coil holder 105. Namely, a plurality of coils 104 are copper wires wound along an outer circumference of the rod 101 with the direction in which the magnets 103 of the rod 101 are arrayed being as their center. The coils 104 are arrayed in the same direction as that in which the magnets 103 are arrayed. Because it is necessary to insulate the adjacent coils 104, a ring-like spacer 105a made of a resin is interposed between the coils 104. On the coil holder 105, there is provided a printed circuit board 106. End portions 104a of the wiring of the coil 104 are connected to the printed circuit board 106.

In the first embodiment, by insert molding in which the coils 104 and the coil holder 105 are set in a mold and in which molten resin or special ceramics is injected into the mold, the coil container case 102 is molded integrally with the coils 104. As shown in FIG. 2, on the coil container case 102, there are formed a plurality of fins 102a for enhancing the radiation performance of the coils 104. Note that the coils 104 held by the coil holder 105 may be contained in a coil container case 102 made of aluminum, and that a gap between the coils 104 and the coil container case 102 may be filled with an adhesive, to thereby fix the coils 104 and the coil holder 105 to the coil container case 102.

Figure 4:
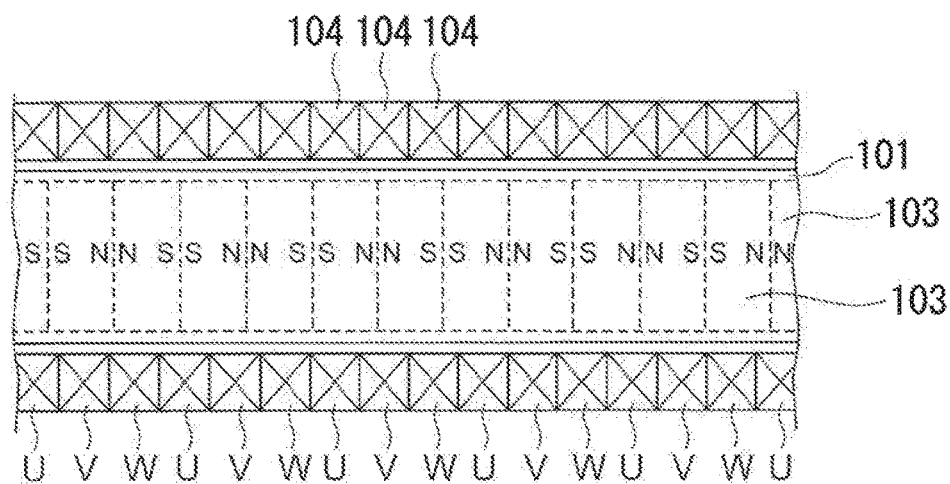
FIG. 4 is a diagram showing a positional relationship between magnets and coils of each linear motor according to the present embodiment.

FIG. 4 is a diagram showing a positional relationship between the magnets 103 and the coils 104 of each linear motor 10 of the first embodiment. In the hollow space in the interior of the rod 101, the plurality of cylindrical magnets 103 (segment magnets) are arrayed so that the same poles face each other. Three coils 104 form a three-phase coil with U, V, and W phases. A plurality of sets of three-phase coils is combined to form a coil unit. When a three-phase current whose phases are 120° different from each other is applied to the plurality of coils 104 that are divided into three phases of U, V, and W, then a shifting magnetic field is generated that moves in the axis line direction of the coils 104. The rod 101 obtains thrust from actions between the magnetic field generated by the magnets 103 as drive magnets and the shifting magnetic field, to thereby make a linear movement relatively to the coils 104 in synchronization with the speed of the shifting magnetic field.

As shown in FIG. 2, to a first of the end cases 109 as magnetic sensor container cases, there is attached a magnetic sensor 112 for detecting a position of the rod 101. The magnetic sensor 112 is arranged with a predetermined gap from the rod 101, and detects a change in the direction of the magnetic field (direction of the magnetic vector) that is generated, through the linear movement of the rod 101, by the magnets 103 stacked in the interior of the rod 101. Note that in the first embodiment, description will be for the case where, of the plurality of linear motors 10A, 10B, and 10C, the linear motor 10C has the magnetic sensor 112 while the linear motors 10A and 10B do not have the magnetic sensor 112. According to the detected direction of the magnetic field, the magnetic sensor 112 outputs two signals (sine wave signal and cosine wave signal) with shapes of sine waves that are different in phase by 90 degrees. The magnetic sensor 112 functions as an incremental encoder that outputs two signals in accordance with an amount of movement of the rod 101.

Figure 5:
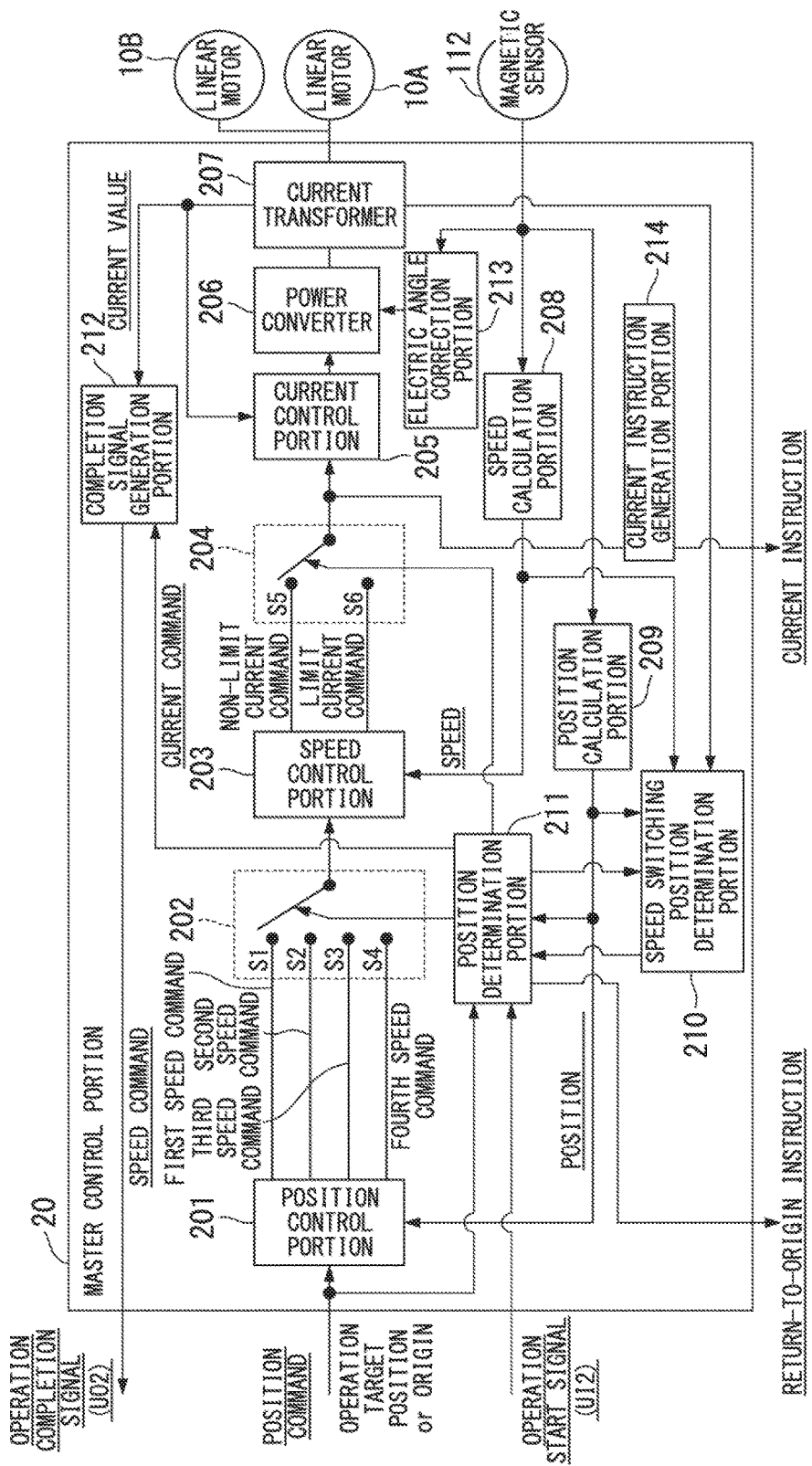
FIG. 5 is a block diagram showing a configuration of a master control portion according to the present embodiment.

FIG. 5 is a block diagram showing a configuration of the master control portion 20 according to the first embodiment. The master control portion 20 controls the linear motors 10A and 10B. Furthermore, the master control portion 20 inputs a signal, which is output by the magnetic sensor 112 of the linear motor 10C, via the assist control portion 40. The master control portion 20 includes: a position control portion 201; a switch portion 202; a speed control portion 203; a switch portion 204; a current control portion 205; a power converter 206; a current transformer (CT) 207; a speed calculation portion 208; a position calculation portion 209; a speed switching position determination portion 210; a position determination portion 211; a completion signal generation portion 212; an electric angle correction portion 213; and a current instruction generation portion 214. Hereafter, the case will be described in which the position of the pressurizing body 11 when the rods 101 are moved to the uppermost points is used as origin, which functions as the reference position of the pressurizing body 11. Furthermore, the electric angles of the linear motors 10A, 10B, and 10C always coincide, and change in a synchronized manner.

Based on a position command that is input from the outside and on information indicative of the positions of the rods 101 of the linear motors 100A and 10B, the position control portion 201 calculates a speed command. The information indicative of the positions of the rods 101 of the linear motors 10A and 10B is calculated by the position calculation portion 209. The position control portion 201 stores beforehand a first speed (FL1SPD), a second speed (FL2SPD), a third speed (FL3SPD), and a fourth speed (FL4SPD). The position control portion 201 outputs four speed commands (a first speed command, a second speed command, a third speed command, and a fourth speed command) that are based on the first speed to the fourth speed. Based on the control by the position determination portion 211, the switch portion 202 selects any one of the four speed commands that are output by the position control portion 201. The switch portion 202 outputs the selected speed command to the speed control portion 203.

The first speed command is a command indicative of a speed at which the rod 101 moves when the pressurizing body 11, which is attached to a first end of the rod 101, moves from the predetermined origin to a vicinity (FL (Force Limit) mode start position) of the workpiece 33. In the first speed command, an upper limit value of the speed at which the rods 101 are moved is predetermined as the first speed (FL1SPD). For example, the maximum speed when the linear motors 100A and 10B move the rods 101 is defined as the first speed (FL1SPD).

The second speed command is a command indicative of the speed at which the rods 101 move when the pressurizing body 11 moves from the vicinity of the workpiece 33 until it is brought into contact with the workpiece 33. In the second speed command, the speed at which the rods 101 are moved is predetermined as the second speed (FL2SPD). The second speed (FL2SPD) is a speed slower than the first speed (FL1SPD), and is set to a speed at which a pressure not more than a given value is applied to the workpiece 33 when the pressurizing body 11 is brought into contact with the workpiece 33.

The third speed command is a command indicative of a speed at which, after the workpiece 33 is mounted on the printed wiring board 31 by pressing the pressurizing body 11 against the workpiece 33, the rods 101 and the pressurizing body 11 are moved in a direction away from the workpiece 33. In the third speed command, the speed at which the rods 101 are moved is predetermined as the third speed (FL3PSD). Namely, the third speed command is a command that is used when the rods 101 and the pressurizing body 11 are moved toward the origin.

The fourth speed command is a command indicative of a speed at which after the workpiece 33 is mounted on the printed wiring board 31 by pressing the pressurizing body 11 against the workpiece 33, the rods 101 are moved toward the origin. In the fourth speed command, an upper limit value of the speed at which the rods 101 are moved is predetermined as the fourth speed (FL4SPD).

Furthermore, the fourth speed (FL4SPD) is set to a speed faster than the third speed (FL3SPD). For example, similarly to the first speed (FL1SPD), the fourth speed (FL4SPD) is defined as the maximum speed when the linear motors 10A and the 10B move the rods 101.

To the speed control portion 203, the speed command selected by the switch portion 202 and the speed information indicative of the speed at which the rods 101 of the linear motors 10A and 10B move are input. The speed information is calculated by the speed calculation portion 208. Based on the deviation between the speed indicated by the speed command and the speed indicated by the speed information, the speed control portion 203 calculates a current value for rendering the speed, at which the rods 101 move, to the speed indicated by the speed command.

Furthermore, the speed control portion 203 outputs the calculated current value as a non-limit current command, and also outputs a limit current command that is a current command whose upper limit value is a predetermined current limit value (FL2I). If the calculated current value is less than the current limit value (FL2I), then the non-limit current command and the limit current command indicate the same current value. On the other hand, if the calculated current value is not less than the current limit value (FL2I), then the non-limit current command indicates the calculated current value while the limit current command indicates the current limit value (FL2I). The current limit value (FL2I) is predetermined based on the thrust of each linear motor 10 and a force with which the workpiece 33 is pressed when the workpiece 33 is mounted on the printed wiring board 31. Based on the control by the position determination portion 211, the switch portion 204 selects either current command out of the limit current command and the non-limit current command that are output by the speed control portion 203. The switch portion 204 outputs the selected current command to the current control portion 205 and to the current instruction generation portion 214.

Based on the current command selected by the switch portion 204 and on the current value of the current that is flowing through the linear motors 10A and 10B that is measured by the current transformer 207, the current control portion 205 calculates a voltage command that makes smaller the deviation between the selected current command and the measured current value. Based on the electric angle that is input from the electric angle correction portion 213 and on the voltage command calculated by the current control portion 205, the power converter 206 applies a voltage to the coils 104 of the U, V, and W phases of the linear motors 10A and 10B. The power converter 206 applies a voltage to the coils 104 of the U, V, and W phases so that the maximum thrust can be obtained at the input electric angle. The current transformer 207 is attached to a power line that connects between the power converter 206 and the linear motors 10A and 10B. The current transformer 207 measures a current value of the current flowing through the power line. The current transformer 207 outputs a signal indicative of the measured current value to the current control portion 205, to the speed switching position determination portion 210, and to the completion signal generation portion 212.

Based on the amounts of changes in the sine wave signal and cosine wave signal that are output from the magnetic sensor 112 attached to the linear motor 10C, the speed calculation portion 208 calculates a moving speed of the rods 101 provided to the linear motors 10A and 10B. Based on the amounts of changes in the two signals (the sine wave signal and the cosine wave signal) that are output from the magnetic sensor 112, the position calculation portion 209 calculates an amount of movement of the rod 101 from the origin. The position calculation portion 209 outputs position information indicative of the position of the rod 101 to the position control portion 201, to the speed switching position determination portion 210, and to the position determination portion 211.

The speed switching position determination portion 210 outputs a signal indicative of the FL mode start position to the position determination portion 211. The FL mode start position is a position in which, when the rods 101 and the pressurizing body 11 are moving toward the workpiece 33 and the printed wiring board 31, the speed command is switched from the first speed command to the second speed command. Furthermore, the speed switching position determination portion 210 outputs a signal indicative of a speed switching position (FL3POS) to the position determination portion 211. The speed switching position is a position in which, when the rods 101 are being moved toward the origin after the workpiece 33 is pressed against the printed wiring board 31, the speed command is switched from the third speed command to the fourth speed command.

Furthermore, when performing the process of pressing the workpiece 33 for the first time, the speed switching position determination portion 210 outputs a previously-stored default switching position (FL2POSSUB) to the position determination portion 211 as the FL mode start position. Based on the speed and position at which the rod 101 is moving when the workpiece 33 is pressed for the first time and on the current flowing through the linear motors 10A and 10B, the speed switching position determination portion 210 updates the FL mode start position so as to shorten the time required for the step of pressing the workpiece 33 and thereby attaching the workpiece 33 to the printed wiring board 31. After this, the speed switching position determination portion 210 outputs the updated FL mode start position to the position determination portion 211. The default switching position is a position predetermined according to the height of the workpiece 33, and is also a position where the pressurizing body 11 (the rod 101 of each linear motor 10) is caused to start decelerating so as not to impart unnecessary impact to the workpiece 33 when the pressurizing body 11 is brought into contact with the workpiece 33. As the speed switching position (FL3POS), for example the same position as the default switching position (FL2POSSUB) is preset.

Based on the position command and operation start signal that are input from the outside and on the position information that is output by the position calculation portion 209, the position determination portion 211 performs control of causing the switch portion 202 to select any one of the four speed commands that are output by the position control portion 201. Furthermore, based on the position command and the operation start signal, and on the position information, the position determination portion 211 performs control of causing the switch portion 204 to select either one of the two current commands that are output by the speed control portion 203. Furthermore, in a return-to-origin process, the position determination portion 211 outputs a return-to-origin instruction to the assist control portion 40.

When the pressurizing body 11 is pressurizing the workpiece 33, the completion signal generation portion 212 outputs an operation completion signal (UO2) to the outside if the current value measured by the current transformer 207 becomes greater than a predetermined current limit value (FL2I).

The electric angle correction portion 213 calculates an electric angle from the sine wave signal and cosine wave signal that are output by the magnetic sensor 112. Furthermore, according to the control by the position determination portion 211, the electric angle correction portion 213 outputs, to the power converter 206, either electric angle out of the calculated electric angle and the electric angle obtained by correcting the calculated electric angle.

The current instruction generation portion 214 generates a current instruction, which is a signal (for example, a digital signal) that is transformed from the current command selected by the switch portion 204 and that is transmittable and receivable between the master control portion 20 and the assist control portion 40. The current instruction generation portion 214 outputs the generated current instruction to the assist control portion 40.

Figure 6:
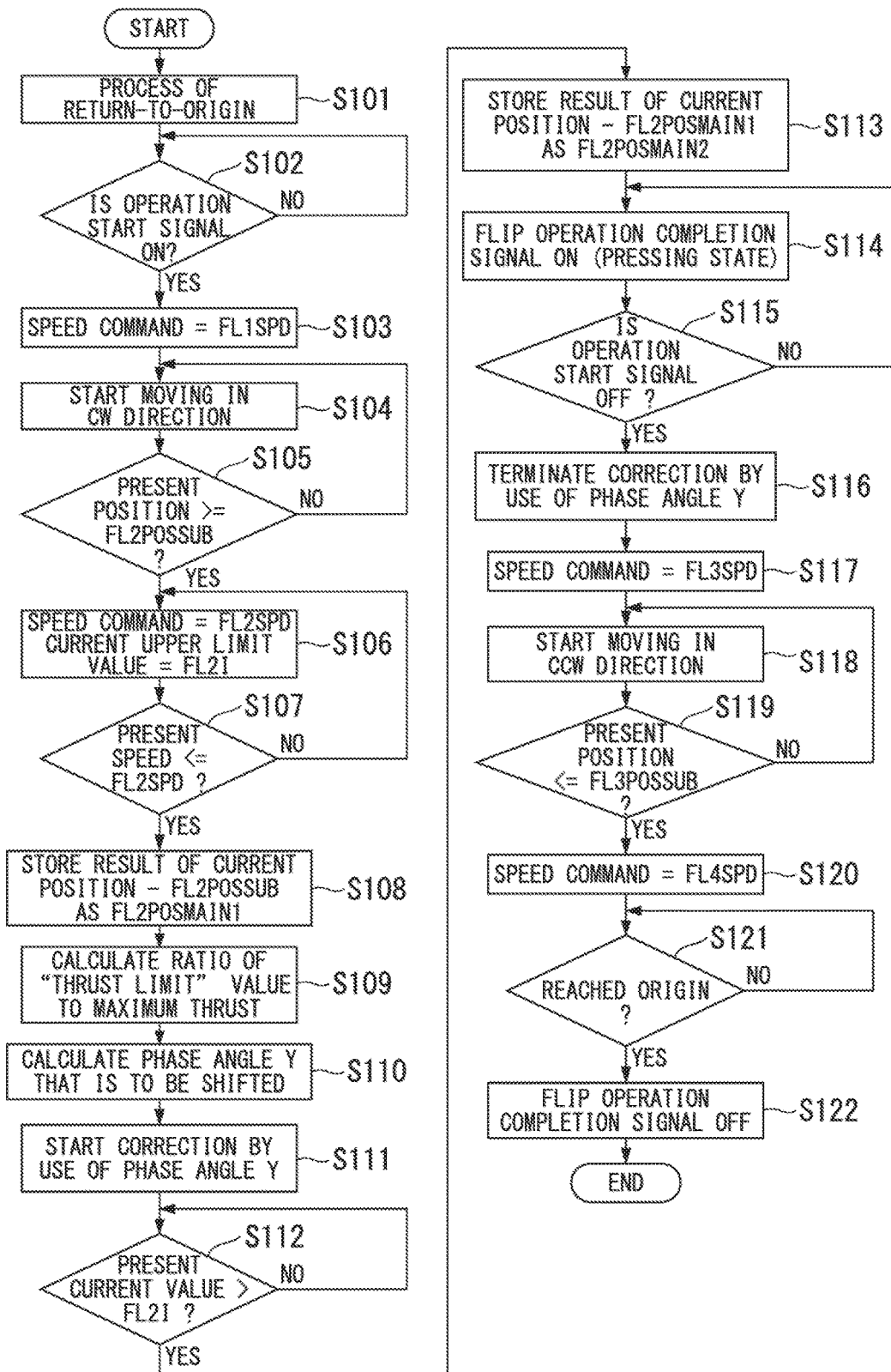
FIG. 6 is a flow chart showing the control performed by the master control portion when a machining apparatus 1 according to the present embodiment presses a workpiece for the first time.

Next is a description of the control performed by the master control portion 20 when the machining apparatus 1 presses the workpiece 33 against the printed wiring board 31. FIG. 6 is a flow chart showing the control performed by the master control portion 20 when the machining apparatus 1 according to the first embodiment presses the workpiece 33 for the first time.

Here, a direction in which the pressurizing body 11 moves closer to the workpiece 33 and the printed wiring board 31 is referred to as CW direction while a direction in which the pressurizing body 11 moves away from the workpiece 33 and the printed wiring board 31 is referred to as CCW direction.

When the position command based on the position of the workpiece 33 is input from the outside, the master control portion 20 starts to drive the linear motors 10A and 10B to perform the return-to-origin process of moving the pressurizing body 11 to the origin (step S101). The return-to-origin process is a process where in each of the linear motors 10A and 10B, the rod 101 is pulled to a predetermined magnetic pole position by direct-current energization, and where with reference to the electric angle in accordance with the magnetic pole position, the rod 101 is moved to an upper end (origin) in the movable range.

In detecting that the rods 101 have moved to the upper ends in the movable ranges, the position determination portion 211 outputs a return-to-origin instruction to the assist control portion 40. The detection of the rod 101 having moved to the upper end in the movable range is performed by, for example, detecting that, after detecting that the rod 101 is moving upwardly, the rod 101 has reached the end in the movable range and stopped.

Furthermore, in the return-to-origin process, in the period from the time when the position determination portion 211 outputs the return-to-origin instruction to the assist control portion 40 to the time when a detection of a retention current is completed in the assist control portion 40, the current control portion 205 temporarily halts a current application to the linear motors 10A and 10B. This temporary halt of current application is made at a predetermined time.

On completion of the return-to-origin process, the position determination portion 211 determines whether the operation start signal (UI2) from the outside is ON or not (step S102), and waits until the operation start signal is flipped ON (step S102: NO). If the operation start signal is flipped ON (step S102: YES), then the position determination portion 211 causes the switch portion 202 to select the first speed command, and also causes the switch portion 204 to select the non-limit current command (step S103), to thereby move the rods 101 of the linear motors 10A and 10B toward the workpiece 33 (in the CW direction) (step S104).

The position determination portion 211 determines whether the position of the pressurizing body 11 has reached the default switching position (FL2POSSUB) or not (step S105), and drives the linear motors 10A and 10B by use of the first speed command until the pressurizing body 11 reaches the default switching position (FL2POSSUB) (step S105: NO). If the pressurizing body 11 reaches the default switching position (FL2POSSUB) (step S105: YES), then the position determination portion 211 causes the switch portion 202 to select the second speed command, and also causes the switch portion 204 to select the limit current command (step S106), to thereby decelerate the moving speed of the rods 101.

After the second speed command is selected, the speed switching position determination portion 210 determines whether the moving speed of the rod 101 is less than or equal to the second speed (FL2SPD) or not (step S107), and repeats the determination until the moving speed of the rods 101 is less than or equal to the second speed (FL2SPD) (step S107: NO). If the moving speed of the rods 101 becomes less than or equal to the second speed (FL2SPD) (step S107: YES), then the speed switching position determination portion 210 calculates a difference (FL2POSMAIN1) between the present position of the pressurizing body 11 and the default switching position (FL2POSSUB), and stores the calculated difference (FL2POSMAIN1) (step S108).

The electric angle correction portion 213 calculates a ratio X of "thrust limit value" to the maximum thrust of the linear motors 10A and the 10B (="thrust limit value"/"maximum thrust") (step S109). Here, the thrust limit value corresponds to the maximum value of the load that may be applied to the workpiece 33 and the printed wiring board 31. The electric angle correction portion 213 calculates a phase angle Y that corresponds to the ratio X of the thrust that has been calculated in step S109, by use of Equation (1) below (step S10).

$$Y = \cos^{-1}(X) \quad (1)$$

Note that $\cos^{-1}(\cdot)$ in Equation (1) is an arccosine function.

Instead of the electric angle calculated from the sine wave signal and cosine wave signal that are output by magnetic sensor 112, the electric angle correction portion 213 outputs a corrected electric angle, which is obtained by adding the phase angle Y to the electric angle, to the power converter 206 (step S111). Hereafter, while the electric angle correction portion 213 is outputting the corrected electric angle, the power converter 206 applies a voltage of the phase, which is advanced by the phase angle Y relative to the magnetic pole position of the rod 101, to the coils 104 of the U, V, and W phases. Note that the correction by use of the phase angle Y may be performed by subtracting the phase angle Y from the electric angle. In this case, the power converter 206 applies a voltage of the phase, which is delayed by the phase angle Y relative to the magnetic pole position of the rod 101, to the coils 104 of the U, V, and W phases The speed switching position determination portion 210 determines whether the current value measured by the current transformer 207 is greater than the current limit value (FL2I) or not (step S112), and waits until the current value becomes greater than the current limit value (FL2I) (step S112: NO). If determining that the current value measured by the current transformer 207 has reached the current limit value (FL2I) and that the measured current value is greater than the current limit value (FL2I) (step S112: YES), then the speed switching position determination portion 210 stores a position, which is obtained by subtracting the difference (FL2POSMAIN1) calculated in step S108 from the present position of the pressurizing body 11, as a new FL mode start position (FL2POSMAIN2) (step S113). At this time, the completion signal generation portion 212 flips the operation completion signal (UO2) ON and outputs it to the outside (step S114).

Note that in step S114, when a new FL mode start position (FL2POSMAIN2) is calculated, a predetermined distance Δd may be provided as a margin. To be more specific, a position obtained by subtracting the difference (FL2POSMAIN1) and the distance Δd from the present position of the pressurizing body 11 may be established as a new FL mode start position (FL2POSMAIN2).

The position determination portion 211 determines whether an operation start signal that is input from the outside is OFF or not (step S115), and waits until the operation start signal is flipped OFF (step S115: NO). If the operation start signal is flipped OFF (step S115: YES), then according to the position command whose movement destination is the origin, the position control portion 201 calculates a speed command. Instead of the corrected electric angle, the electric angle correction portion 213 outputs an electric angle, which has been calculated from the two signals output by the magnetic sensor 112, to the power converter 206 (step S116). Namely, the drive of the linear motors 10A and 10B by use of the corrected electric angle is terminated.

The position determination portion 211 causes the switch portion 202 to select the third speed command, and also causes the switch portion 204 to select the limit current command (step S117), to thereby move the rods 101 toward the origin (in the CCW direction) (step S118).

The position determination portion 211 determines whether the pressurizing body 11 has reached the speed switching position (FL3POS) or not (step S119), and waits until the pressurizing body 11 reaches the speed switching position (FL3POS) (step S119: NO). If the pressurizing body 11 reaches the speed switching position (FL3POS) (step S119: YES), then the position determination portion 211 causes the switch portion 202 to select the fourth speed command (step S120).

The position determination portion 211 determines whether the pressurizing body 11 has reached the origin or not (step S121), and waits until the pressurizing body 11 reaches the origin (step S121: NO). If the pressurizing body 11 reaches the origin (step S121: YES), then the position determination portion 211 outputs a signal, which indicates that the pressurizing body 11 has reached the origin, to the completion signal generation portion 212. According to the signal that has been output from the position determination portion 211, the completion signal generation portion 212 flips the operation completion signal OFF (step S122), to thereby terminate the operation of pressing the workpiece 33 for the first time against the printed wiring board 31.

Figure 7:
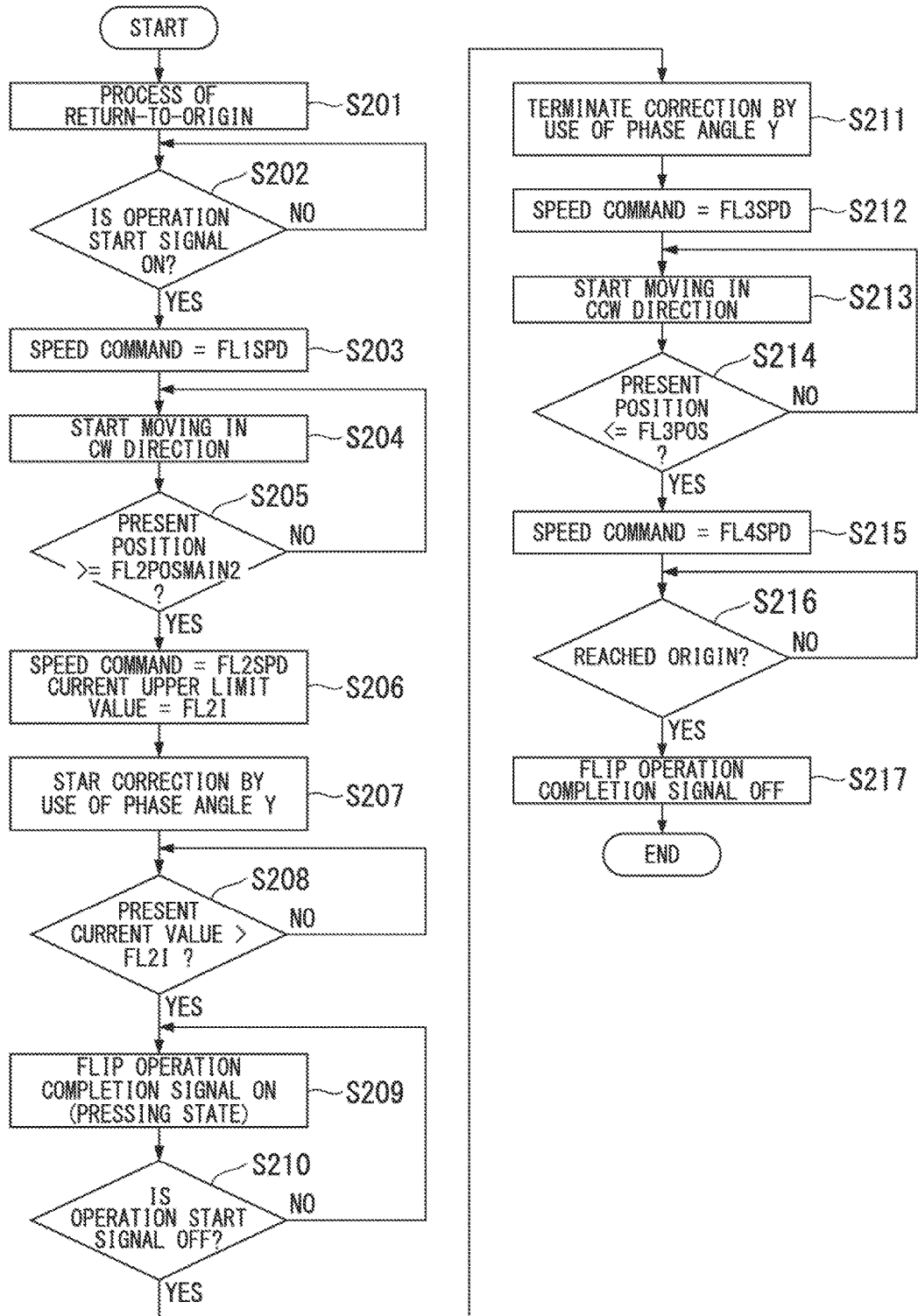
FIG. 7 is a flow chart showing the control that is performed by the master control portion according to the present embodiment by use of an updated FL mode start position.

FIG. 7 is a flow chart showing the control by the master control portion 20 according to the first embodiment by use of the updated FL mode start position. If the position of the printed wiring board 31, to which the workpiece 33 is to be attached, or the position command based on the position of the workpiece 33 is input from the outside, then the master control portion 20 starts the drive of the linear motors 10A and 10B, to thereby perform the return-to-origin process of returning the pressurizing body 11 to the origin (step S201). The return-to-origin process performed in step S201 is the same process as the return-to-origin process in step S101.

On completion of the return-to-origin process, the position determination portion 211 determines whether the operation start signal (UI2) from the outside is ON or not (step S202), and waits until the operation start signal is flipped ON (step S202: NO). If the operation start signal is flipped ON (step S202: YES), then the position determination portion 211 causes the switch portion 202 to select the first speed command, and also causes the switch portion 204 to select the non-limit current command (step S203), to thereby move the rods 101 of the linear motors 10A and 10B toward the workpiece 33 (in the CW direction) (step S204).

The position determination portion 211 determines whether the position of the pressurizing body 11 has reached the FL mode start position (FL2POSMAIN2) or not (step S205), and drives the linear motors 10A and 10B by use of the first speed command until the pressurizing body 11 reaches the FL mode start position (FL2POSMAIN2) (step S205: NO). If the pressurizing body 11 reaches the FL mode start position (FL2POSMAIN2) (step S205: YES), then the position determination portion 211 causes the switch portion 202 to select the second speed command, and also causes the switch portion 204 to select the limit current command (step S206), to thereby decelerate the moving speed of the rods 101.

If the moving speed of the rods becomes less than equal to the second speed, then instead of the electric angle calculated from the sine wave signal and cosine wave signal that are output by the magnetic sensor 112, the electric angle correction portion 213 outputs a corrected electric angle, which is obtained by adding the phase angle Y to the electric angle, to the power converter 206 (step S207).

The speed switching position determination portion 210 determines whether the current value measured by the current transformer 207 is greater than the current limit value (FL2I) or not (step S208), and waits until the measured current value becomes greater than the current limit value (FL2I) (step S208: NO). If determining that the current value measured by the current transformer 207 has reached the current limit value (FL2I) and that the measured current value is greater than the current limit value (FL2I) (step S208: YES), then the speed switching position determination portion 210 outputs a signal, which indicates that the current value is greater than the current limit value (FL2I), to the completion signal generation portion 212 via the position determination portion 211. The completion signal generation portion 212 flips the operation completion signal (UO2) ON and outputs it to the outside (step S209).

The position determination portion 211 determines whether an operation completion signal that is input from the outside is OFF or not (step S210), and waits until the operation start signal is flipped OFF (step S210: NO). If the operation start signal is flipped OFF (step S210: YES), then according to the position command whose movement destination is the origin, the position control portion 201 calculates a speed command. Instead of the corrected electric angle, the electric angle correction portion 213 outputs an electric angle, which has been calculated from the sine wave signal and cosine wave signal that are output by the magnetic sensor 112, to the power converter 206 (step S211). Namely, the drive of the linear motors 10A and 10B by use of the corrected electric angle is terminated.

The position determination portion 211 causes the switch portion 202 to select the third speed command, and also causes the switch portion 204 to select the limit current command (step S212), to thereby move the rods 101 toward the origin (in the CCW direction) (step S213).

The position determination portion 211 determines whether the pressurizing body 11 has reached the speed switching position (FL3POS) or not (step S214), and waits until the pressurizing body 11 reaches the speed switching position (FL3POS) (step S214: NO). If the pressurizing body 11 reaches the speed switching position (FL3POS) (step S214: YES), then the position determination portion 211 causes the switch portion 202 to select the fourth speed command (step S215).

The position determination portion 211 determines whether the pressurizing body 11 has reached the origin or not (step S216), and waits until the pressurizing body 11 reaches the origin (step S216: NO). If the pressurizing body 11 reaches the origin (step S216: YES), then the position determination portion 211 outputs a signal, which indicates that the pressurizing body 11 has reached the origin, to the completion signal generation portion 212, and the completion signal generation portion 212 in turn flips the operation completion signal (UO2) OFF (step S217), to thereby terminate the operation of pressing the workpiece 33 against the printed wiring board 31.

Figure 8:
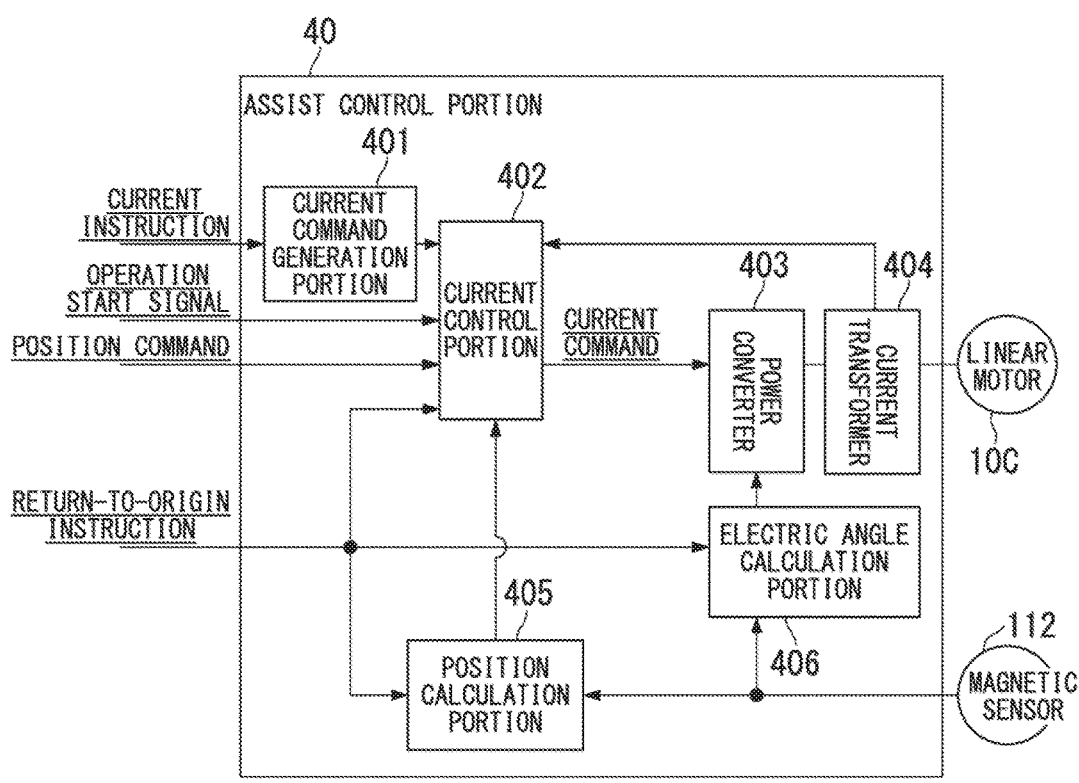
FIG. 8 is a block diagram showing a configuration of an assist control portion according to the present embodiment.

FIG. 8 is a block diagram showing a configuration of the assist control portion 40 according to the first embodiment.

The assist control portion 40 includes: a current command generation portion 401; a current control portion 402; a power converter 403; a current transformer 404; a position calculation portion 405; and an electric angle calculation portion 406.

From the current instruction that is input from the master control portion 20, the current command generation portion 401 generates a current command that follows the current command in the master control portion 20. For example, if the current command is a digital signal, then a stepwise-changing, discrete current command is generated that is obtained by quantizing the current command in the master control portion 20. The current command generation portion 401 outputs the generated current command to the current control portion 402.

Based on the current command generated by the current command generation portion 401 and on the current value of the current that is flowing through the linear motor 10C that is measured by the current transformer 404, the current control portion 402 calculates a voltage command that makes small the deviation between the current command and the measured current value. Note that if the positions of the rods 101 and the pressurizing body 11 are closer to the workpiece 33 than the FL mode start position (FL2POSMAIN2 or FL2POSSUB), then the current control portion 402 outputs a voltage command that corresponds to the retention current. The current control portion 402 obtains the FL mode start position from the position determination portion 211 of the master control portion 20 and stores it.

Here, the retention current is a current value that when the linear motors 10A and 10B are not producing thrust, produces thrust that supports the weights of the rods 101 of the linear motors 10, the coupling plate 12, and the pressurizing body 11. Namely, when the linear motors 10A and 10B are not producing thrust, the current control portion 402 outputs a voltage command corresponding to the retention current to the power converter 403. This causes the linear motor 10C to produce thrust that resists the gravitation acting on the rods 101 of the linear motor 10, on the coupling plate 12, and on the pressurizing body 11, to thereby make it possible to prevent the pressurizing body 11 from falling down and to keep the pressurizing body 11 to stand still.

Based on the electric angle that is input from the electric angle calculation portion 406 and on the voltage command calculated by the current control portion 205, the power converter 403 applies a voltage to coils 104 of the U, V, and W phases of the linear motor 10C. The power converter 403 applies a voltage to the coils 104 of the U, V, and W phases so that the maximum thrust is obtained at the electric angle that is input. The current transformer 404 is attached to a power line that connects between the power converter 403 and the linear motor 10C. The current transformer 404 measures a current value of the current flowing through the power line. The current transformer 404 outputs a signal indicative of the measured current value to the current control portion 402.

Based on the amounts of changes in the sine wave signal and cosine wave signal that are output from the magnetic sensor 112 attached to the linear motor 10C, the position calculation portion 405 calculates an amount of movement of the rod 101 provided to the linear motor 10C from the origin. The position calculation portion 405 outputs position information indicative of the position of the rod 101 to the current control portion 402. If a return-to-origin instruction is input from the master control portion 20, then the position calculation portion 405 defines the position of the rod 101 of the linear motor 10C and the pressurizing body 11 when the return-to-origin instruction is input as origin (reference position).

The electric angle calculation portion 406 calculates an electric angle from the sine wave signal and cosine wave signal that are output from the magnetic sensor 112. Furthermore, if the return-to-origin instruction is input from the master control portion 20, then the electric angle calculation portion 406 defines a predetermined default electric angle as present electric angle. The electric angle calculation portion 406 outputs the calculated electric angle to the power converter 403. The default electric angle is an electric angle when the rod 101 is positioned at the upper end of the movable range.

Figure 9:
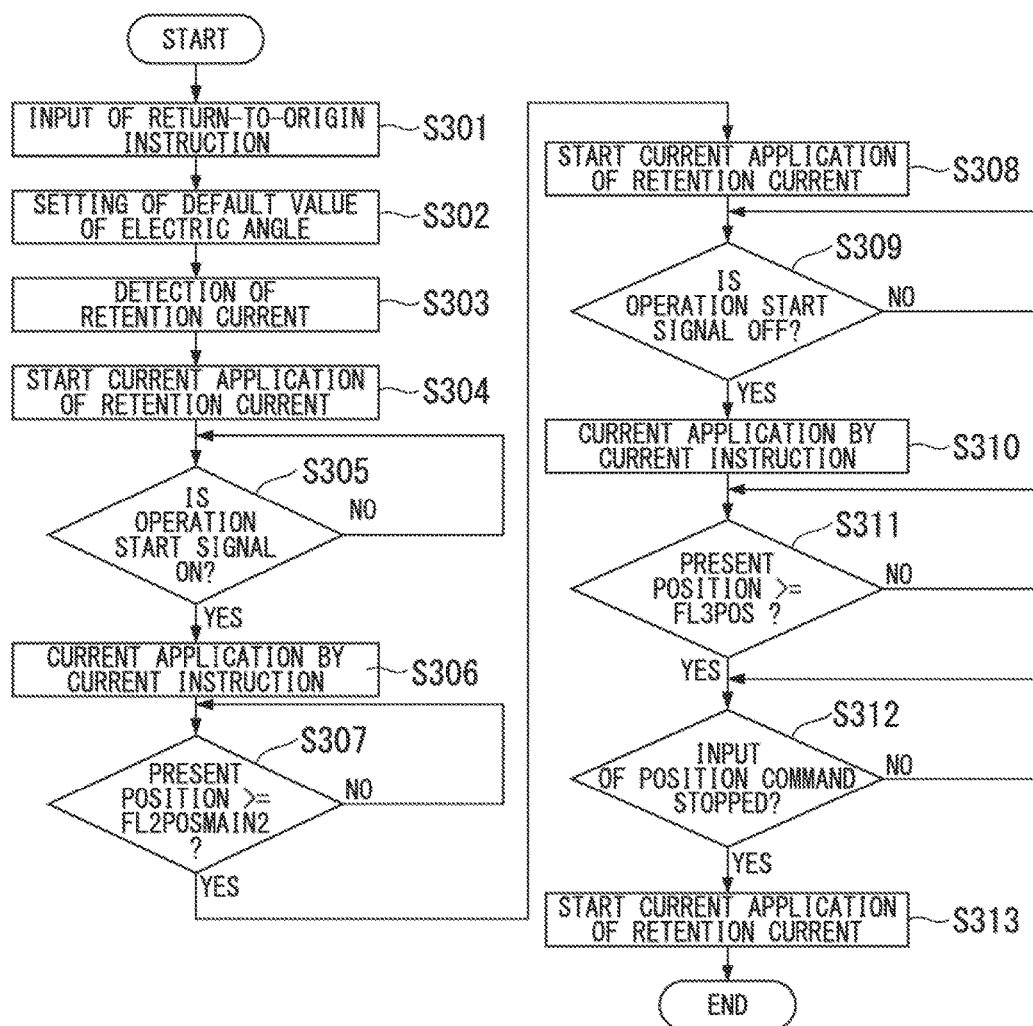
FIG. 9 is a flow chart showing the control performed by the assist control portion when the machining apparatus according to the present embodiment presses a workpiece.

FIG. 9 is a flow chart showing the control performed by the assist control portion 40 according to the first embodiment when the machining apparatus 1 presses the workpiece 33. In the assist control portion 40, if the return-to-origin instruction is input from the master control portion 20 (step S301), then the electric angle calculation portion 406 sets the default electric angle to the present electric angle (step S302).

When the electric angle is set, then the current control portion 402 detects a retention current (step S303). In detecting a retention current, the current control portion 402, for example, outputs a voltage command, which causes the linear motor 10C to produce upward maximum thrust to the power converter 403, and then gradually changes the voltage command in small steps, to thereby gradually decrease the thrust produced by the linear motor 10C. Every time the voltage command is changed, the current control portion 402 determines whether the position of the rod 101 has changed or not, and stores a current value, which corresponds to the voltage command immediately prior to the one with which the position of the rod 101 changed, as the retention current. The detection of the retention current is performed during the period in which the current control portion 205 is temporarily suspending the current application to the linear motors 10A and 10B.

When detecting the retention current, the current control portion 402 outputs, to the power converter 403, a voltage command of applying the retention current to the linear motor 10C, to thereby start a current application of the retention current (step S304).

When starting the current application of the retention current, the current control portion 402 determines whether the operation start signal from the outside is ON or not (step S305), and waits until the operation start signal is flipped ON (step S305: NO). If the operation start signal is flipped ON (step S305: YES), then the current control portion 402 outputs a voltage command corresponding to the current command generated by the current command generation portion 401 to the power converter 403, to thereby start a current application by the current instruction (step S306).

The current control portion 402 determines whether the position of the pressurizing body 11 has reached the FL mode start position (FL2POSMAIN2) or not (step S307), and continues the current application by the current command until the pressurizing body 11 reaches the FL mode start position (FL2POSMAIN2) (step S307: NO). If the pressurizing body 11 reaches the FL mode start position (FL2POSMAIN2) (step S307: YES), then the current control portion 402 outputs a voltage command corresponding to the retention current to the power converter 403, to thereby start a current application by the retention current (step S308).

When starting the current application by the retention current, the current control portion 402 determines whether the operation start signal is OFF or not (step S309), and waits until the operation start signal is flipped OFF (step S309: NO). If the operation start signal is flipped OFF (step S309: YES), then the current control portion 402 outputs, to the power converter 403, a voltage command that corresponds to the current command generated by the current command generation portion 401, to thereby start a current application by the current instruction (step S310).

When starting the current application by the current instruction, the current control portion 402 determines whether the pressurizing body 11 has reached the speed switching position (FL3POS) or not (step S311), and waits until the pressurizing body 11 reaches the speed switching position (FL3POS) (step S311: NO). If the pressurizing body 11 reaches the speed switching position (step S311: YES), then the current control portion 402 determines whether an input of the position command has stopped or not (step S312), and waits until the input of the position command stops (step S312: NO).

If the input of the position command stops (step S312: YES), then the current control portion 402 outputs a voltage command corresponding to the retention current to the power converter 403, to thereby start a current application by the retention current (step S313). Thus, the current control portion 402 terminates the operation at the time of pressing the workpiece 33 against the printed wiring board 31.

Figure 10:
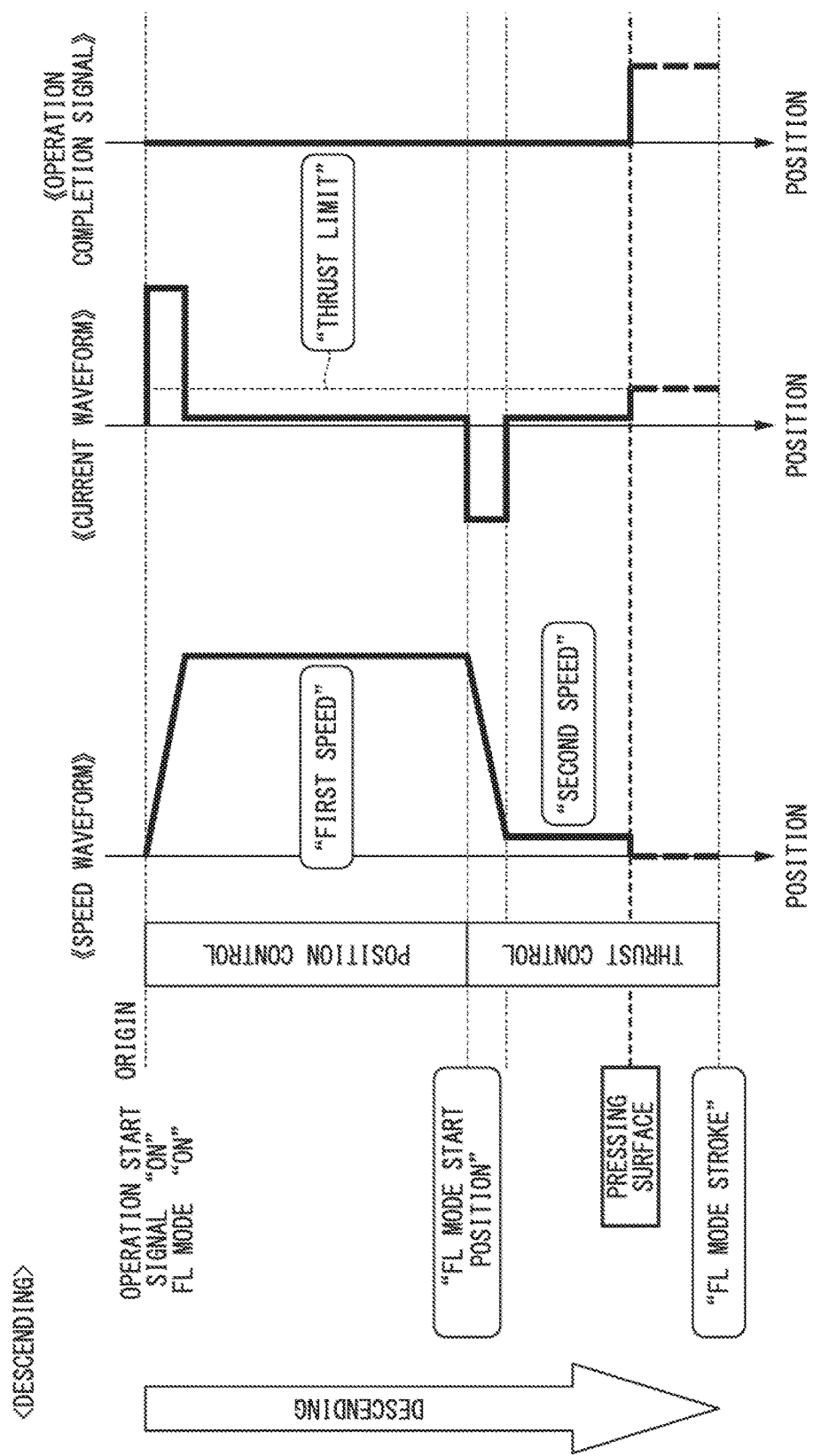
FIG. 10 is a waveform chart showing changes in speed, current, and operation completion signal in the processes in step S202 to step S209 that are performed by the master control portion shown in FIG. 7.

FIG. 10 is a waveform chart showing the changes of the speed, the current, and the operation completion signal in the processes performed by the master control portion 20 from step S202 to step S209 shown in FIG. 7. In the figure, the vertical axes denote a position of the pressurizing body 11.

If the operation start signal is flipped ON, then the master control portion 20 drives the linear motors 10A and 10B to move the pressurizing body 11 toward the workpiece 33 at the first speed (FL1SPD). When the pressurizing body 11 reaches the FL mode start position (FL2POSMAIN2), then the master control portion 20 decelerates the pressurizing body 11 from the first speed (FL1SPD) to the second speed (FL2SPD). At this time, the assist control portion 40 follows the current command in the master control portion 20 to drive the linear motor 10C, to thereby shorten the time required to reach the first speed from the halt state.

The master control portion 20 moves the pressurizing body 11 toward the workpiece 33 at the second speed (FL2SPD) and presses the workpiece 33 toward the printed wiring board 31. At this time, if the force of pressing the workpiece 33 against the pressurizing body 11 becomes greater than the force corresponding to the current limit value (FL2I), then the master control portion 20 flips the operation completion signal ON. At this time, the assist control portion 40 applies the retention current, to thereby cause the linear motor 10C to support the weights of the rods 101 of the linear motors 10A, 10B, and 10C, the coupling plate 12, and the pressurizing body 11.

Figure 11:
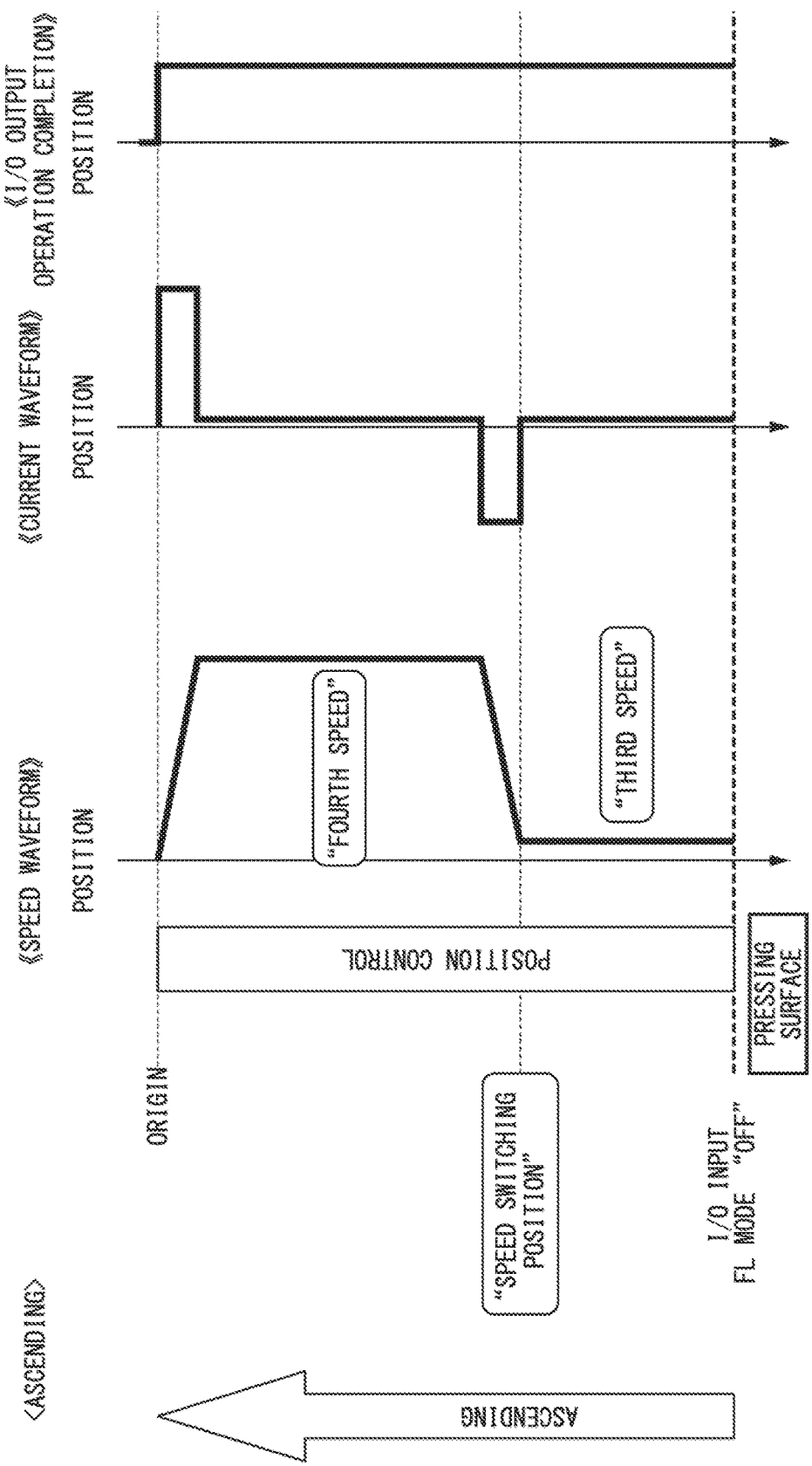
FIG. 11 is a waveform chart showing changes in speed, current, and operation completion signal in the processes in step S212 to step S217 that are performed by the master control portion shown in FIG. 7.

FIG. 11 is a waveform chart showing the changes of the speed, the current, and the operation completion signal in the processes performed by the master control portion 20 from step S212 to step S217 shown in FIG. 7. In the figure, the vertical axes denote a position of the pressurizing body 11.

After pressing the pressurizing body 11 against the workpiece 33, the master control portion 20 causes the pressurizing body 11 to move and ascend toward the origin at the third speed (FL3SPD). When the pressurizing body 11 reaches the speed switching position, then the master control portion 20 moves the pressurizing body 11 toward the origin at the fourth speed (FL4SPD), which is faster than the third speed (FL3SPD). When the pressurizing body 11 comes close to the origin, the master control portion 20 decelerates the moving speed of the rods 101 of the linear motors 10 so that the speed of the pressurizing body 11 becomes zero at the origin. When the pressurizing body 11 reaches the origin, the master control portion 20 flips the operation completion signal OFF. At this time, the assist control portion 40 follows the current command in the master control portion 20 to drive the linear motor 10C, to thereby shorten the time required to move the pressurizing body 11 toward the origin.

As described above, when the master control portion 20 performs control on the linear motors 10A and 10B at the time of pressing the workpiece 33 against the printed wiring board 31, the assist control portion 40 performs control of causing the linear motor 10C to produce thrust in the opposite direction to the gravitation. As a result, own weights of the rods 101 of the linear motors 10, the coupling plate 12, and the pressurizing body 11 are supported by the linear motor 10C. Therefore, the thrust control of the linear motors 10A and 10B pressing the workpiece 33 at a load less than or equal to the own weights is made available.

Furthermore, when the pressurizing body 11 is moved from the origin to the FL mode start position and when the pressurizing body 11 is moved to the origin after completion of the pressing of the workpiece 33, the assist control portion 40 follows the control on the linear motors 10A and 10B to control the linear motor 10C. With the linear motor 10C being driven so as to follow the linear motors 10A and 10B, it is possible to obtain powerful thrust in the acceleration and deceleration of the pressurizing body 11.

With the cooperative control by the master control portion 20 and the assist control portion 40, it is not necessary to use a balancer for equilibrium for cancelling the force, such as gravitation, that acts on the pressurizing body 11. This does not lead to a loss in the thrust of the linear motors 10A and 10B. Furthermore, the master control portion 20 is allowed to perform the thrust control of the linear motors 10A and 10B without regard for the influence of the gravitation or the like that acts on the pressurizing body 11.

As shown in FIG. 1, the position in which the rod 101 of the linear motor 10C is fixed to the coupling plate 12 is a position between the positions in which the respective rods 101 of the linear motors 10A and the linear motor 10B are fixed to the coupling plate 12. Therefore, when the linear motor 10C produces upward thrust under control by the retention current while the linear motors 10A and 10B produce downward thrust, it is possible to suppress the production of distortion caused by forces in opposite directions acting on the coupling plate 12. Furthermore, when seen in the direction perpendicular to the surface on which the rod 101 of the linear motor 10C is fixed to the coupling plate 12, the pressurizing body 11 is attached so that the position to which the rod 101 is fixed and the position in which the pressurizing body 11 is fixed to the coupling plate 12 overlap each other. Thereby, it is possible to apply a load to the pressurizing body 11 in a well-balanced manner via the coupling plate 12.

Modification

Thrust control will be described that utilizes a difference between a current resolution in the control by the master control portion 20 when the current flowing through the linear motors 10A and 10B is controlled and a current resolution in the control by the assist control portion 40 when the current flowing through the linear motor 10C is controlled. Here, description will be for the case where the thrust per 1 [A] of current is the same for the linear motors 10A, 10B, and 10C. Here, the current resolution is a minimum unit when the current in the current application to the linear motor 10 is changed.

FIG. 12 is a diagram showing an example of thrust control that utilizes a difference in current resolution between the master control portion 20 and the assist control portion 40. In the example shown in FIG. 12, the current resolution Rm of the master control portion 20 is 2 [A] while the current resolution Ra of the assist control portion 40 is 0.4 [A]. Furthermore, the retention current H that supports the own weights of the rods 101 of the linear motors 10, the coupling plate 12, and the pressurizing body 11 is −4 [A]. Note that in each current value, the positive current value is a current value that produces downward thrust in the vertical direction while the negative current value is a current value that produces upward thrust in the vertical direction.

Here, in the case where a pressing current command U, which is a command value for the current that is flowed in the linear motors 10A and 10B when the workpiece 33 is pressed, is given, a pressing current value (limit current command) in the master control portion 20 and an assist current value (retention current) in the assist control portion 40 are calculated in the following manner. Firstly, a pressing current value Am in the master control portion 20 is calculated from the pressing current command U by use of Equation (2) and Equation (3) below. A function ceil (x) in Equation (2) is the ceiling function that obtains, for the real number x, the smallest integer greater than or equal to x.

$$A = \text{ceil}(U/Rm) \quad (2)$$

$$Am = Rm \times A \quad (3)$$

A pressing current value Aa in the assist control portion 40 is calculated by use of Equation (4) to Equation (6) below.

A function floor (x) in Equation (5) is the floor function that obtains, for the real number x, the largest integer less than or equal to x.

$$B = U - Am \qquad (4)$$

$$B' = \text{floor}(B/Ra) \qquad (5)$$

$$Aa = H + Ra \times B' \qquad (6)$$

As shown in FIG. 12, if the pressing current command U simply applies a retention current to the linear motor 10C for the case of each of 1 [A], 11 [A], 13 [A], 15.1 [A], and 18.7 [A], the pressing current command Am for the linear motors 10A and 10B is 2 [A], 12 [A], 14 [A], 16 [A], and 20 [A], respectively. In these cases, errors occurring in pressing the workpiece 33 are 1 [A], 1 [A], 1 [A], 0.9 [A], and 1.3 [A], respectively.

On the other hand, if Equation (2) to Equation (6) described above are used, then for the case where the pressing current command is 1 [A], 11 [A], 13 [A], 15.1 [A], and 18.7 [A], errors occurring in the current value Atotal that generates a pressing load of the workpiece 33 are 0.2 [A], 0.2 [A], 0.2 [A], −0.1 [A], and −0.1 [A], respectively. Therefore, it is possible to obtain accurate pressing loads.

A correction between the limit current command and the retention current in the modification is made after the detection of the retention current is performed in the assist control portion 40. For example, the retention current detected in the assist control portion 40 and the current resolution of the assist control portion 40 are notified to the speed control portion 203 of the master control portion 20. Then, based on the pressing current command that is input from a higher-level device, the speed control portion 203 calculates a pressing current value (corrected limit current command) of the master control portion 20 and an assist current value (corrected retention current) of the assist control portion 40. The speed control portion 203 operates by using the calculated pressing current value instead of the predetermined current limit value (FL2I). The current control portion 402 of the assist control portion 40 obtains the assist current value calculated by the speed control portion 203, and operates by using the assist current value instead of the retention current.

As described above, with the limit current command in the master control portion 20 and the retention current in the assist control portion 40 when the workpiece 33 is pressed being corrected, it is possible to obtain a pressing load more accurate than that in the case where the assist control portion 40 simply applies a retention current, which supports the own weights, to the linear motor 10C.

Note that in the machining apparatus 1 according to the first embodiment, description has been for the structure in which the master control portion 20 controls the two linear motors 10A and 10B. However, the present invention is not limited to this structure. The master control portion 20 may control a single linear motor 10, or may control three or more linear motors 10. Note that in the case where the master control portion 20 controls three or more linear motors 10, the rod 101 of the linear motor 10C may be fixed to the center of gravity of the positions in which the rods 101 of the linear motor 10 are fixed to the coupling plate 12.

Furthermore, in the machining apparatus 1 according to the first embodiment, description has been for the structure in which the assist control portion 40 controls a single linear motor 10C. However, the present invention is not limited to this structure. The assist control portion 40 may control two or more linear motors 10. At this time, the positions in which the rods 101 of the linear motors 10 controlled by the assist control portion 40 are fixed to the coupling plate 12 may coincide, in the center of gravity, with the positions in which the rods 101 of the linear motors 10 controlled by the master control portion 20 are fixed to the coupling plate 12.

Furthermore, in the machining apparatus 1 according to the first embodiment, description has been for the structure in which linear motors 10 of rod type are used. However, the present invention is not limited to this structure. Linear motors of slider type may be used.

Second Embodiment

Figure 13:
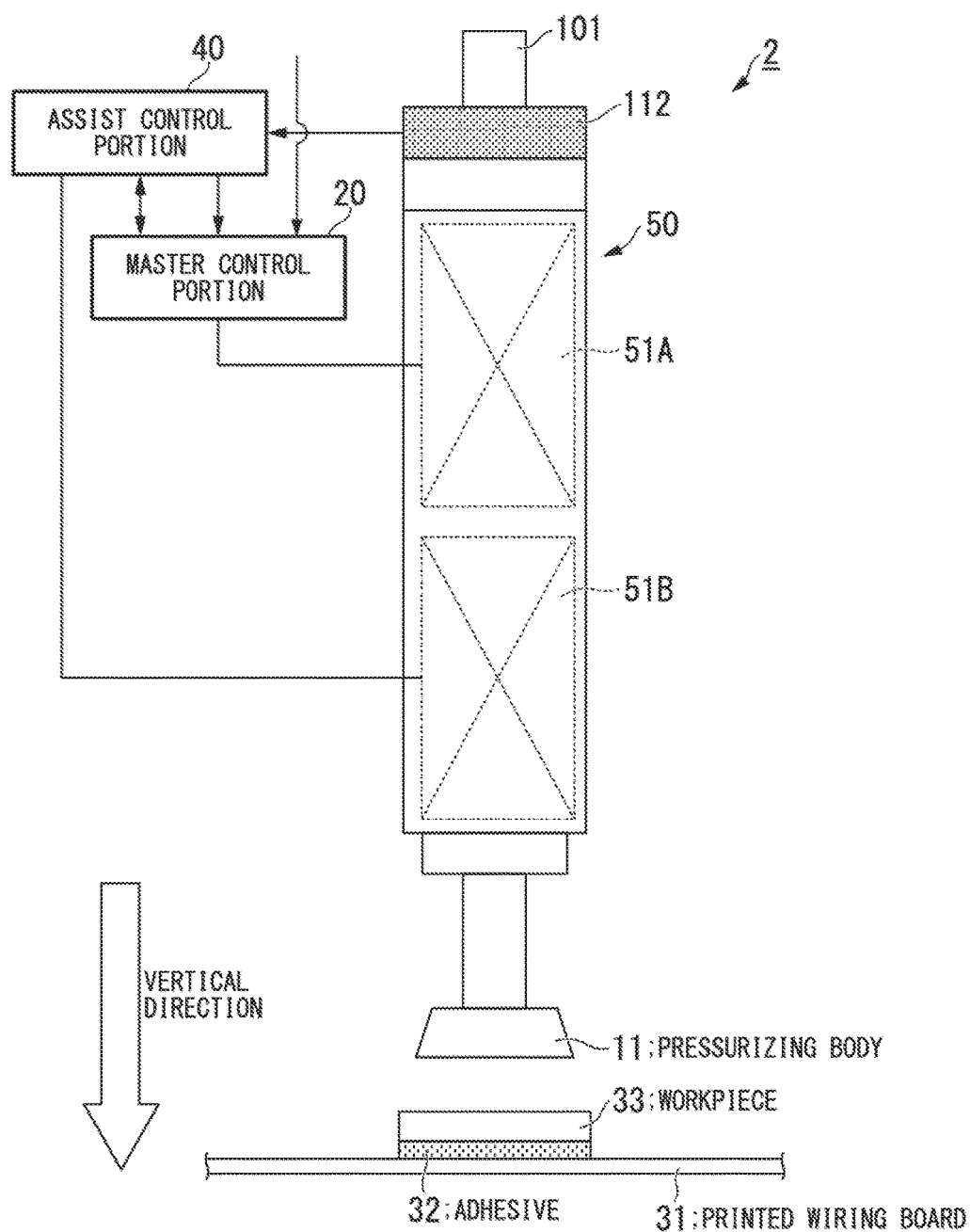
FIG. 13 is a block diagram showing a structure of a machining apparatus to which a linear motor apparatus according to a second embodiment is applied.

FIG. 13 is a block diagram showing a structure of a machining apparatus 2 to which a linear motor apparatus according to a second embodiment is applied. Note that the constituent elements the same as those provided in the machining apparatus 1 according to the first embodiment will be denoted with the same reference signs, and will not be repetitiously explained. The machining apparatus 2 includes: a linear motor 50 that is made by including a linear motor 51A and a linear motor 51B; a pressurizing body 11 attached to a rod 101 that is a movable body of the linear motor 51A and the linear motor 51B; a master control portion 20 as a first control portion that control the drive of the linear motor 51A; and an assist control portion 40 as a second control portion that controls the drive of the linear motor 51B. The movable body of the linear motor 51A and the linear motor 51B is formed as a single rod 101. According to a resultant force obtained by combining the thrusts produced by the linear motor 51A and the linear motor 51B, the rod 101 moves.

The linear motor 50 is structured as a single motor so as to include the linear motor 51A and the linear motor 51B. To be more specific, a plurality of coils of the linear motor 51A and a plurality of coils of the linear motor 51B are coaxially arranged, and the rod 101 is arranged so as to penetrate through the interiors of the coils. In the structure shown in FIG. 13, the coils of the linear motor 51A are arranged on an upper side in the vertical direction, and the coils of the linear motor 51B are arranged on a lower side of the coils of the linear motor 51A. In the linear motor 50, a magnetic sensor 112 is arranged on an upper side of the linear motor 51A. Similarly to the case of the linear motor 10 shown in the first embodiment, the linear motor 51A and the linear motor 51B include a plurality of coils. Any one of the U phase, the V phase, and the W phase is allocated to each coil, and thus, each three-phase coil is made of a set of three coils of the U, V, and W phases. Each of the linear motor 51A and the linear motor 51B includes a plurality of three-phase coils.

In the machining apparatus 2 according to the second embodiment, the master control portion 20 controls the linear motor 51A while the assist control portion 40 controls the linear motor 51B. When the linear motor 51A produces thrust to press the workpiece 33 against the printed wiring board 31, the assist control portion 40 performs control of causing the linear motor 51B to produce thrust in the opposite direction to the gravitation. As a result, it is possible for the linear motor 51B to support own weights of the rod 101 and the pressurizing body 11. Therefore, the thrust control of the linear motor 51A pressing the workpiece 33 at a load of the own weights or less is made available.

Furthermore, with the linear motor 51A controlled by the master control portion 20 being located closer to the magnetic sensor than the linear motor 51B, it is possible to suppress the influence of error in position detection that occurs from expansion or shrink of the rod 101 due to the temperature of the environment in which the machining apparatus 2 is used.

Figure 14:
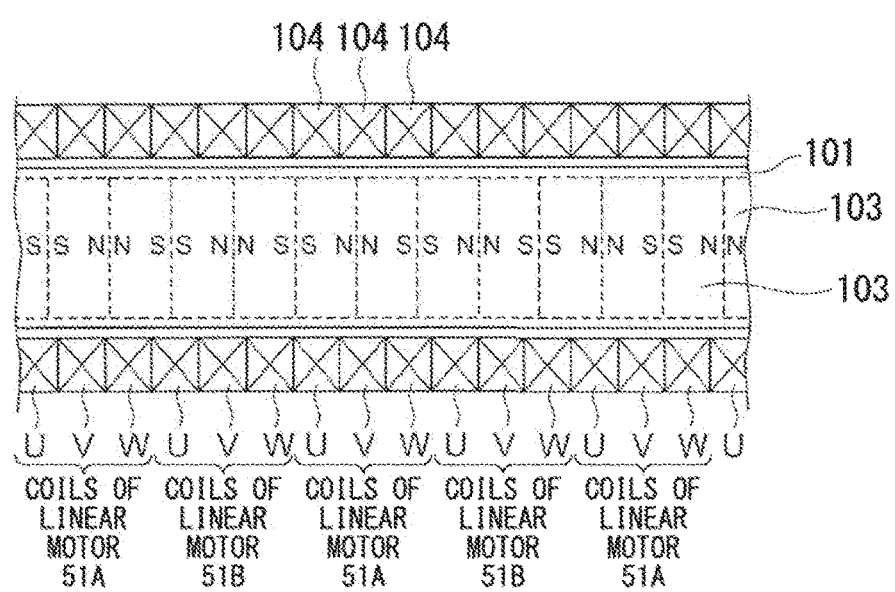
FIG. 14 is a diagram showing an example of arranging coils of two linear motors in an alternate manner.

Note that, in FIG. 13, description has been for the structure in which the coils of the linear motor 51A and the coils of the linear motor 51B are arranged in a separate manner. However, the structure is not limited to that shown in FIG. 13. The coils of the linear motor 51A and the coils of the linear motor 51B may be arranged in an alternate manner in the linear motor 50. For example, the coils may be arranged as shown in FIG. 14. FIG. 14 is a diagram showing an example in which the respective coils of the two linear motors 51A, 51B are arranged in an alternate manner. As shown in FIG. 14, sets of coils of the U, V, and W phases are arranged so that the sets for the linear motor 51A and the sets for the linear motor 51B are alternated. With this arrangement, it is possible to increase the locations in which the linear motor 51A and the linear motor 51B are brought into contact with each other. This makes it possible to disperse the locations, in the rod 101, to which forces in different directions that are produced by the linear motors 51A, 51B are applied. As a result, it is possible to reduce the deformation and deterioration of the rod 101 that are caused by the forces in different directions acting on the rod 101.

Furthermore, also in the machining apparatus 2 according to the second embodiment, it is possible to utilize a difference in current resolution between the master control portion 20 and the assist control portion 40 to improve the accuracy of the pressing load, as shown in the first embodiment.

Furthermore, in FIG. 13, description has been for the structure in which the linear motor 50 includes the two linear motors 51A, 51B. However, the linear motor 50 may have a structure so as to include three or more linear motors which share the rod 101 (movable body) and in which the centers of the coils are coaxially arranged.

Note that in the embodiments, the structure has been shown in which the moving direction of the movable body possessed by the linear motor is the vertical direction, and in which the assist control portion 40 produces thrust that cancels the gravitation as an external force. However, also in the case where an external force other than the gravitation acts on the movable body or the like, the assist control portion 40 may control the linear motor to produce the thrust that cancels the external force. Thereby, without regard for the influence of the external force acting on the movable body, the master control portion 20 is capable of controlling the linear motor. Therefore, it is possible to make the control easy.

The aforementioned master control portion and assist control portion may have, in their insides, a computer system. In that case, a procedure of processes of the control of the aforementioned linear motor are stored in the form of a program in a recording medium readable by a computer. With this program being read and executed by a computer, the aforementioned processes are performed. Here, a recording medium readable by a computer refers to a magnet disk, a magnetooptical disk, a CD-ROM, a DVD-ROM, a semiconductor memory, and so on. Furthermore, this compute program may be distributed to a computer over a communication line, and a computer that has received the distribution may execute the program.

INDUSTRIAL APPLICABILITY

The present invention is applicable also to uses in which it is indispensable to make thrust control easy while suppressing a thrust loss of the driving linear motor.

BRIEF DESCRIPTION OF THE REFERENCE SYMBOLS

1: machining apparatus (linear motor apparatus)
10A, 10B, 51A: linear motor (first linear motor)
10C, 51B: linear motor (second linear motor)
12: coupling plate
20: master control portion (first control portion)
33: workpiece (pressurizing target)
40: assist control portion (second control portion)
101: rod (movable body)

The invention claimed is:

1. A linear motor apparatus, comprising:
a first linear motor and a second linear motor, movable bodies of which move in a same direction in a linked manner;
a first control portion that causes the first linear motor to produce thrust to apply a load to a pressurizing target via the movable bodies; and
a second control portion that causes the second linear motor to produce thrust and controls the thrust,
wherein, if the first control portion is causing a load to be applied to the pressurizing target, then the second control portion causes the second linear motor to produce thrust in an opposite direction to a force produced by gravitation to the movable bodies.

2. The linear motor apparatus according to claim 1, wherein if the first control portion is not causing a load to be applied to the pressurizing target, then the second control portion causes the second linear motor to produce thrust in a same direction as thrust produced by the first linear motor.

3. The linear motor apparatus according to claim 1, further comprising
a coupling plate that connects between the movable body possessed by the first linear motor and the movable body possessed by the second linear motor.

4. The linear motor apparatus according to claim 3, wherein if a plurality of the first linear motors is provided, then the movable body of the second linear motor is fixed to the coupling plate in a position that is sandwiched between positions in which the movable bodies of the first linear motors are fixed to the coupling plate.

5. The linear motor apparatus according to claim 1, wherein the movable body possessed by the first linear motor and the movable body possessed by the second linear motor are coaxially formed as an integral body.

6. The linear motor apparatus according to claim 5, wherein a plurality of coils provided in the first linear motor and a plurality of coils provided in the second linear motor are arranged in an alternate manner.

7. The linear motor apparatus according to claim 1, wherein moving directions of the movable body possessed by the first linear motor and the movable body possessed by the second linear motor are a vertical direction, and
wherein if the first control portion is causing a load to be applied to the pressurizing target, then the second control portion causes the second linear motor to produce upward thrust in the vertical direction that supports weights of the movable bodies.

8. The linear motor apparatus according to claim 1, wherein if current resolution in current application to the first linear motor by the first control portion and resolution in current application to the second linear motor by the second control portion are different, then the second control portion causes the second linear motor to produce thrust in the opposite direction greater than forces produced by gravitation respectively to the movable bodies of the first linear motor and the second linear motor.

9. A control method for a linear motor apparatus that comprises:
- a first linear motor and a second linear motor, movable bodies of which move in a same direction in a linked manner;
- a first control portion that causes the first linear motor to produce thrust to apply a load to a pressurizing target via the movable bodies; and
- a second control portion that causes the second linear motor to produce thrust and controls the thrust, the control method comprising:
a first step in which, if the first control portion is causing a load to be applied to the pressurizing target, then the second control portion causes the second linear motor to produce thrust in an opposite direction to a force produced by gravitation to the movable bodies.

* * * * *